United States Patent
Hornkvist

(10) Patent No.: US 9,098,603 B2
(45) Date of Patent: Aug. 4, 2015

(54) INDEX PARTITIONING AND SCOPE CHECKING

(75) Inventor: John Martin Hornkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1346 days.

(21) Appl. No.: 11/924,596

(22) Filed: Oct. 25, 2007

(65) Prior Publication Data

US 2008/0306927 A1    Dec. 11, 2008

Related U.S. Application Data

(60) Provisional application No. 60/943,056, filed on Jun. 10, 2007.

(51) Int. Cl.
   *G06F 17/30* (2006.01)

(52) U.S. Cl.
   CPC ................................ *G06F 17/30997* (2013.01)

(58) Field of Classification Search
   CPC ................................................ G06F 17/30442
   USPC ...................................... 707/3, 715
   See application file for complete search history.

(56) References Cited

U.S. PATENT DOCUMENTS

| | | | |
|---|---|---|---|
| 6,216,123 B1 * | 4/2001 | Robertson et al. | 707/3 |
| 6,898,592 B2 * | 5/2005 | Peltonen et al. | 707/1 |
| 7,606,793 B2 * | 10/2009 | Merrigan et al. | 707/1 |
| 7,672,928 B2 * | 3/2010 | Maloney et al. | 707/715 |
| 2006/0069982 A1 * | 3/2006 | Petriuc | 715/500 |

* cited by examiner

*Primary Examiner* — Etienne Leroux
*Assistant Examiner* — Chelcie Daye
(74) *Attorney, Agent, or Firm* — Blakely, Sokoloff, Taylor & Zafman LLP

(57) ABSTRACT

Systems and methods for processing an index are described. Searches are scope checked more efficiently using a forward lookup process based on the size of the requested search scope. In addition, an index is partitioned into separate stores based on a search scope that is learned based on where the user commonly conducts searches. As an example, a separate store may be created for a user's home directory should the user be conducting most of his or her searches in that directory. In addition to limiting the size of the index, during retrieval, intelligent index partitioning avoids the need to scope check a common search location.

26 Claims, 6 Drawing Sheets

INDEX PARTITIONING AND SCOPE CHECKING

CROSS-REFERENCE TO RELATED APPLICATIONS

This application is a continuation of U.S. Patent Provisional Application Ser. No. 60/943,056, entitled Intelligent Index Partitioning, filed on Jun. 10, 2007, which is incorporated herein by reference.

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the various content, file, and metadata are indexed for later retrieval using a program such as the Finder program, in what is commonly referred to as an inverted index. For example, an inverted index might contain a list of references to documents in which a particular word appears. Given the large numbers of words and documents in which the words may appear, an inverted index can be extremely large.

The size of an index presents many challenges in processing and storing the index, such as updating the index or using the index to perform a search. The larger an index is, the slower it is to update or search it. However, it is typically faster to search one larger index than two smaller ones. Thus, it is generally beneficial to have as few indexes as possible, such that you rarely have to search more than one index.

The result set when searching a larger index is generally larger than when searching a smaller index. Even though it may be faster to search one large index resulting in a large result set, there may also be a performance benefit to limiting the size of the result set when "scoping" is involved. Scoping refers to searching in a particular place on your hard drive, rather than searching the entire hard drive. It requires a "reverse lookup" from file id to file path, which is a relatively time consuming operation. For example, searching a hard drive for documents containing the term "apple" takes 0.075 seconds; when limited to the user's home directory, it takes much longer, from 0.75 seconds up to 10 seconds!

SUMMARY OF THE DETAILED DESCRIPTION

Methods and systems for processing an inverted index in a data processing system are described herein.

According to one aspect of the invention, a method is provided to efficiently search an index. The method determines a search scope for a user based on a location in which a user conducts searches. The method may store an index referencing items occurring within the determined search scope in an index store separate from an index referencing items occurring outside the determined search scope. In response to a subsequent search conducted in the location corresponding to the determined search scope, the method advantageously retrieves items from the separate index store in an efficient manner.

According to one aspect of the invention, a method is provided to efficiently scope a search based on a size of a result set produced for the search and a size of a directory comprising a search scope location. When the size of the result set is small based on a predetermined size threshold, the method scopes the search using a reverse lookup process. Otherwise, the method scopes the search using a forward lookup process when the size of the directory (or directories) comprising the search scope location is relatively small, based on a predetermined size threshold. During the forward lookup process, the method walks the directory to filter the result set to those results occurring in the list of files within the scope location.

According to one aspect of the invention, the method provides a feedback loop during the forward lookup process, further counting the number of children in the directory and any subdirectories, and updating the size of the directory/directories comprising the scope location for subsequent use.

According to one aspect of the invention, a method is provided to partition the index based on information that is tracked about a system's user(s) behavior when searching an index, including but not limited to, the number of results for queries against the index, the scopes of queries against the index, and an amount of time expended during scope checking a query against the index. Periodically, the method identifies scope locations, such as a directory or directories, experiencing a large number of queries, particularly those in which a large amount of time is expended during scope checking. When a scoped location meets certain criteria, the method partitions the index by generating a separate index for the scoped location. Subsequent searches are performed against the separate index, or indices, in the case of a scoped location that spans more than one index. In some cases, the method may alternatively tag the children of the directory or directories comprising the scoped location, where the tag unambiguously identifies the directory or directories as the parent.

In this manner, the above-described methods advantageously improve the efficiency of searching an index, including reducing the need for scope checking the result set of an index and/or reducing the amount of processor time expended for processing a query and/or scope checking. According to another aspect of the invention, systems and apparatus are provided to carry out any of the above-described methods.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
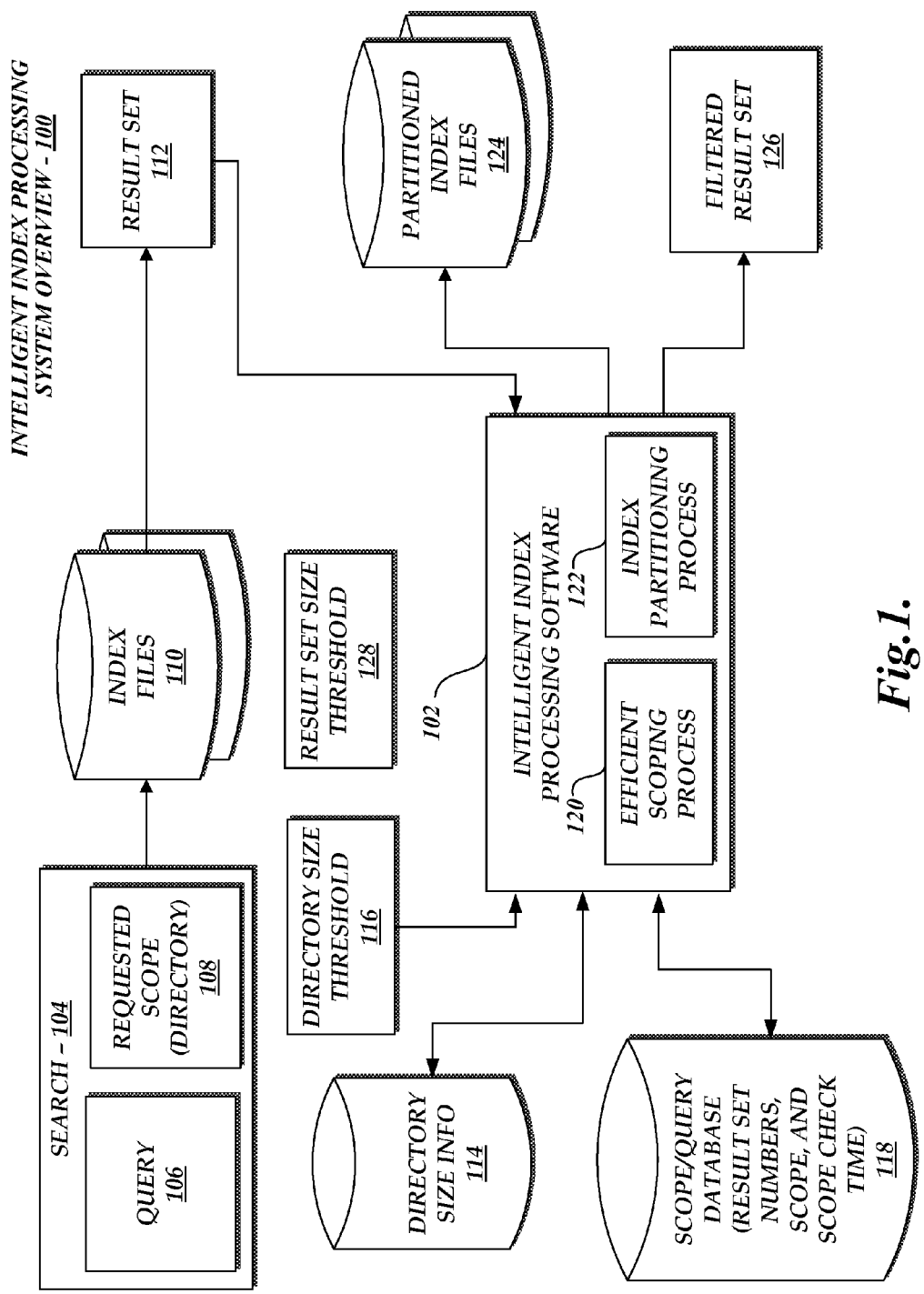
FIG. 1 is a block diagram overview of an architecture for intelligent index processing according to one exemplary embodiment of the invention.

When a directory that the user "scopes" to is very small, an intelligent index partitioning software can keep list of directories that contain few files and avoid the expensive reverse lookup strategy for those directories by instead "walking" the directory to find all files within the directory, using a process referred to as forward lookup. The forward lookup produces a list all files within the "scope," which may then be used to filter the search results from the index.

In a typical embodiment, the query against the index is processed first, which allows the intelligent index partitioning software to decide which approach to take depending on the number of results from the index; if the number of results is small, then reverse lookup may be an attractive option.

Since the user's entire hard drive for is typically scanned for initial indexing, an initial list of directories or locations where this forward lookup approach is attractive may be created at that time. Directories may be subsequently added or removed over time as the user runs queries. Accordingly, when a directory that was initially categorized as small enough to process using forward lookup grows to contain many files, it will be removed from the list of small directories.

This approach adequately covers directories with a small number (hundreds, thousands) of children, but is not attractive for directories with a large number of children. Therefore additional measures to intelligently partition the index may be taken.

In a typical embodiment, the following steps may be taken. During initial indexing, an intelligent index partitioning software collects information about the number of children of each directory. During a search, a retrieval software may consult this information to decide the most efficient way to perform scope checking based on this information and the number of candidate results in the query.

In one embodiment, should forward lookup appear to be the most efficient strategy, additional information regarding the number of files encountered in a directory may be tracked during the forward lookup and used to update the information obtained during initial indexing. In this manner, a feedback loop is created to make available up-to-date information with which to determine the most efficient strategy for a particular search.

In a typical embodiment, intelligent index partitioning advantageously decreases the number of results from the index that has to be post filtered, by, depending on the behavior of the user, subdividing the index for the volume based on the "scopes" that the user(s) on the system use. That is, if a user typically scopes his searches to either her computer or her "Documents" folder, and the "Documents" folder contains a significant subset of the documents on the computer, then it is attractive to separate documents within that location, either logically, by tagging them with an indexable attribute as described in commonly assigned co-pending U.S. patent application Ser. No. 11/760,511, entitled Storage, Organization and Searching of Data Stored on a Storage Medium, or physically, by creating a separate index for that location, i.e., by partitioning the index.

During operation, when a user performs a query, an intelligent index partitioning software tracks the number of results, the "scope" of the query, and how much time is spent checking the scope, storing this information in a database. At regular intervals the database may be consulted to facilitate identifying those locations that have a large number of queries, and where a large amount of time is spent in "scope checking." Since directories form a tree structure, time spent in sub directories is also added to the scope time for its parents, as a total for that directory. A directory is selected if a) it has a large number of searches compared to its children, b) it has a number of searches that is a significant fraction of the total number of searches in its parent, or that is great compared to the number of searches with the parent specified as the scope, c) it is not "small," and d) it has a high cost for scope checking (based on the time spent scope checking for this directory).

In a typical embodiment, for any directories that fulfill the above-listed criteria, the intelligent index partitioning software will walk the directory, i.e., do a forward lookup, and either a) remove it from the current index, and add it to a new index, specific to that location, or b) set a tag on the children of that directory (and its sub-directories) that unambiguously identifies the directory as the parent. Tagging has the advantage of being more flexible, but there is then overhead for consulting the tag when doing a scoped query. However, that overhead is small compared to normal reverse-lookup scope checking.

In one embodiment, when a query has a scope that encompasses or spans more than one index, i.e., a split index, then it may be necessary to consult all the indexes that are within that scope. When the children in a directory have been tagged, then the tag that most closely matches the location may be used for performing a scoped query.

FIG. 1 illustrates an intelligent index processing system overview 100 in which a search 104 comprising a query 106 and a requested scope 108, such as a directory name, is processed against one or more index files 110 to produce a result set 112.

In one embodiment, an intelligent index processing software 102, including but not limited to an efficient scoping process 120 and an index partitioning process 122, determines how to best process the scoped search 104 based on various information, such as the size of the result set 112 (i.e. the number of candidate results produced by running the query before scope checking), directory size information 114 for the number of children in a particular directory, including the directory or directories that may comprise the requested scope 108. Additional information that may be used during intelligent index processing software 102 include the directory size thresholds 116 currently being used to determine whether a directory is considered small, the result set size thresholds 128 currently being used to determine whether the number of results in a candidate result set is small, and a scope/query database 118 that is generated and maintained by the intelligent index processing software 102 to assist in the determination of when to partition or tag an index to facilitate efficient searching.

In one embodiment, the output of the intelligent index processing software 102 includes, among others, one or more partitioned index files 124 for those scoped locations that are determined to be searched more efficiently using a separate index, as well as the filtered result set 126 of a given search processed by the efficient scoping process 120.

Figure 2:
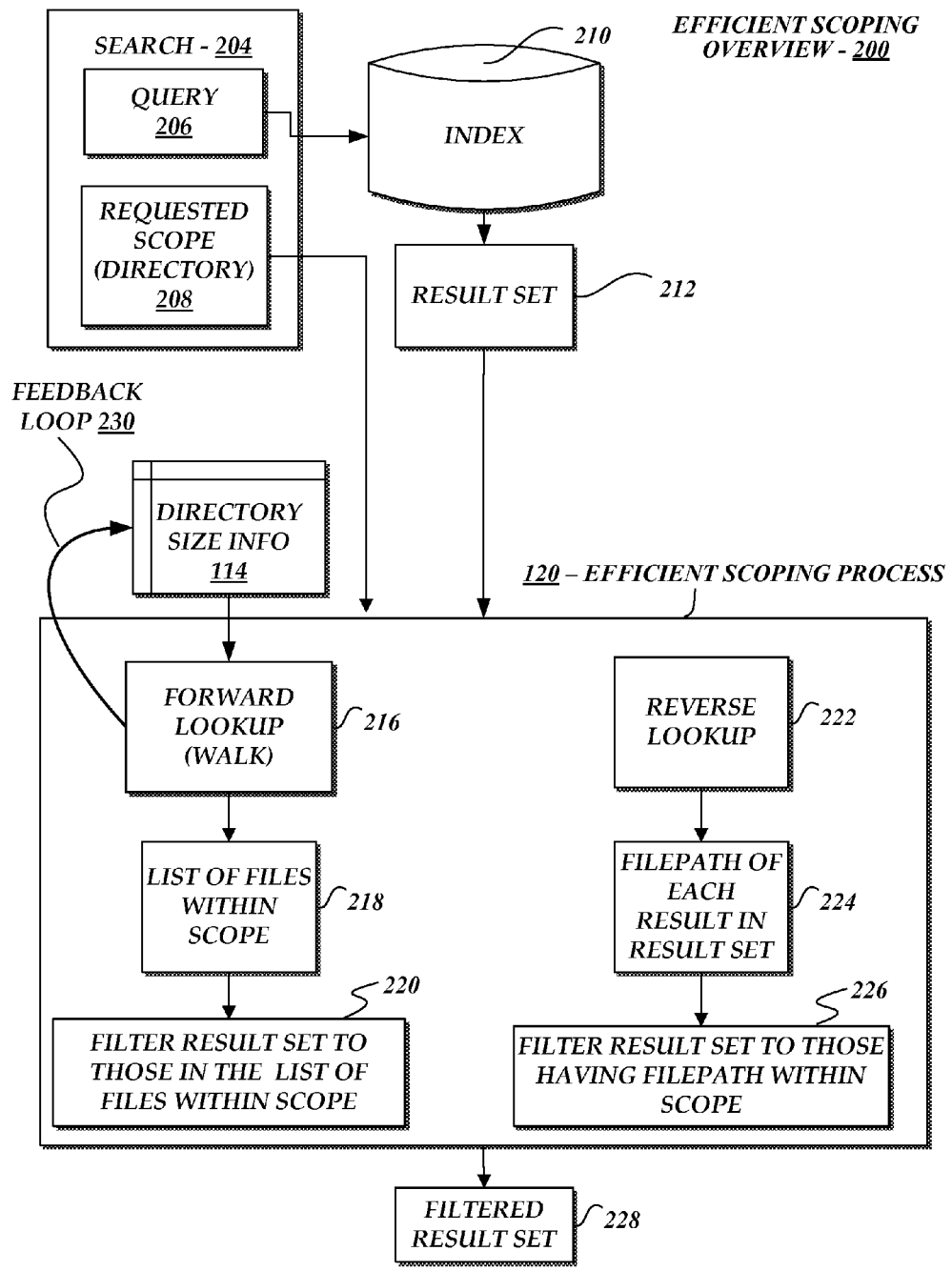
FIG. 2 is a block diagram illustrating one aspect of intelligent index processing according to one exemplary embodiment of the invention.

FIG. 2 illustrates an overview 200 of an efficient scoping process 120 (FIG. 1) according to one embodiment of the invention. As shown, a search 204 comprising a query 206 and a requested scope 208, such as a directory name, is processed against one or more index files 210 to produce a result set 212. The efficient scoping process 120 uses the number of candidate results in the result set 212 to determine whether to perform a reverse lookup 222 or whether to consult the directory size information 114 and perform a forward lookup 216.

In one embodiment, the reverse lookup 222 may be performed in a conventional manner and generally requires determining a filepath of each result in the result set 224 and filtering 226 the result set 228 to return only those candidate results having a filepath within the requested scope 208.

In one embodiment, the forward lookup 216 includes walking the directory (or directories) specified in the requested scope 208 to produce a list of files within the directory (or directories), i.e., the list of files within the requested scope 218, and filtering 220 the result set 228 to return only those candidate results that are in the list of files within the requested scope 218. During the forward lookup process 216, a feedback loop 230 is provided to update the directory size information 114 for the currently requested scoped directory (or directories), which may have changed since the system was initially scanned and the directory size information was first counted.

Figure 3:
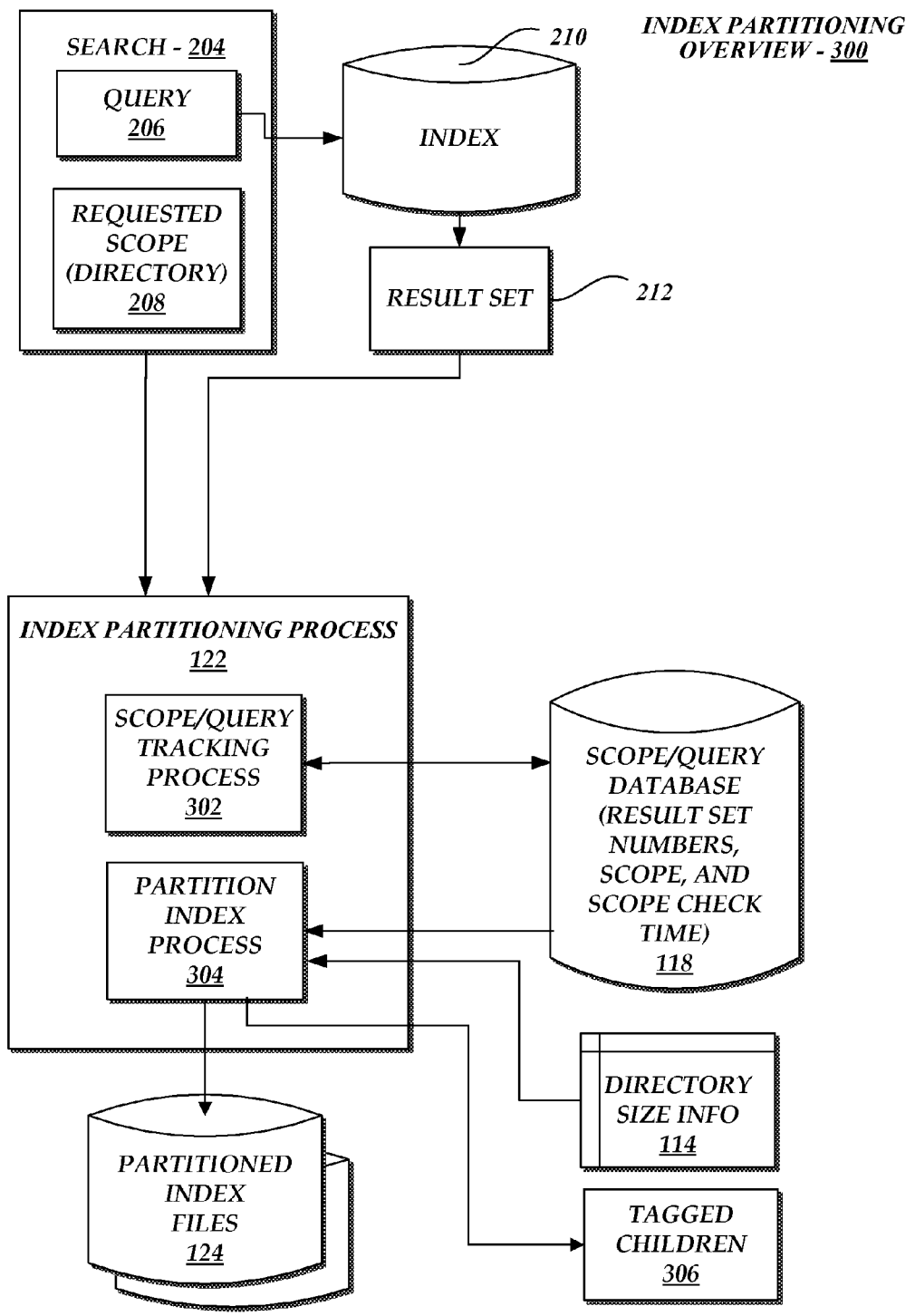
FIG. 3 is a block diagram illustrating another aspect of intelligent index processing according to one exemplary embodiment of the invention.

FIG. 3 illustrates an overview 300 of a index partitioning process 122 in accordance with one embodiment of the invention. As in FIG. 2, a search 204 comprising a query 206 and a requested scope 208, such as a directory name, is processed against one or more index files 210 to produce a result set 212. In one embodiment, an index partitioning process 122, including but not limited to a scope/query tracking process 302 and a partition index process 304, facilitate efficient searching by tracking and monitoring searches against an index and determining when to partition the index or take other actions, such as tagging the children in directories that are frequently scoped. In one embodiment, the scope/query tracking process 302 tracks, among other data, the number of candidate results produced for a query, a requested scope location for a query, and the amount of processor time expending in scope checking a query for a given requested scope 208, and stores the tracked data in a scope/query database 118. In one embodiment, the partition index process 304 uses the tracked scope/query data from the scope/query database 118 as well as the current size of the directories 114 (as updated during the efficient scoping process 120 described earlier), to determine whether searching an index would be facilitated by partitioning certain scoped locations into a separate index. The determination is based on certain criteria, such as whether a particular scoped location, i.e. a directory, is experiencing a large number of searches as compared to the children in the directory, whether the directory is experiencing a significantly large number of searches as compared to the total number of searches in its parent, or a significantly large number of searches as compared to the total number of searches with the parent specified in the requested scope. A large number of searches in one location as compared to another is generally when the number of searches in one location is substantially greater than another location. Other criteria include whether the directory or directories comprising a scoped location is not considered small based on the current threshold for directory size, and whether a large amount of processor time is expended during scope checking, and may further include any other criteria that can serve as predictors or indicators of inefficient searching that, among other inefficiencies, may require an excessive amount of time for scope checking.

In one embodiment, the partition index process 304 generates a separate index file, referred to as a partitioned index file 124, for those scoped locations meeting the aforementioned criteria. Alternatively, the partition index process 304 separates the indexes logically, by tagging the children 306 of the directories comprising the scoped locations meeting the criteria. The actions of partitioning the index 210 into separate partitioned index files 124, or alternatively tagging the directory children 306, advantageously result in more efficient searching of indexes, including more efficient scope checking of subsequent searches 204 having a requested scope 208.

Figure 4:
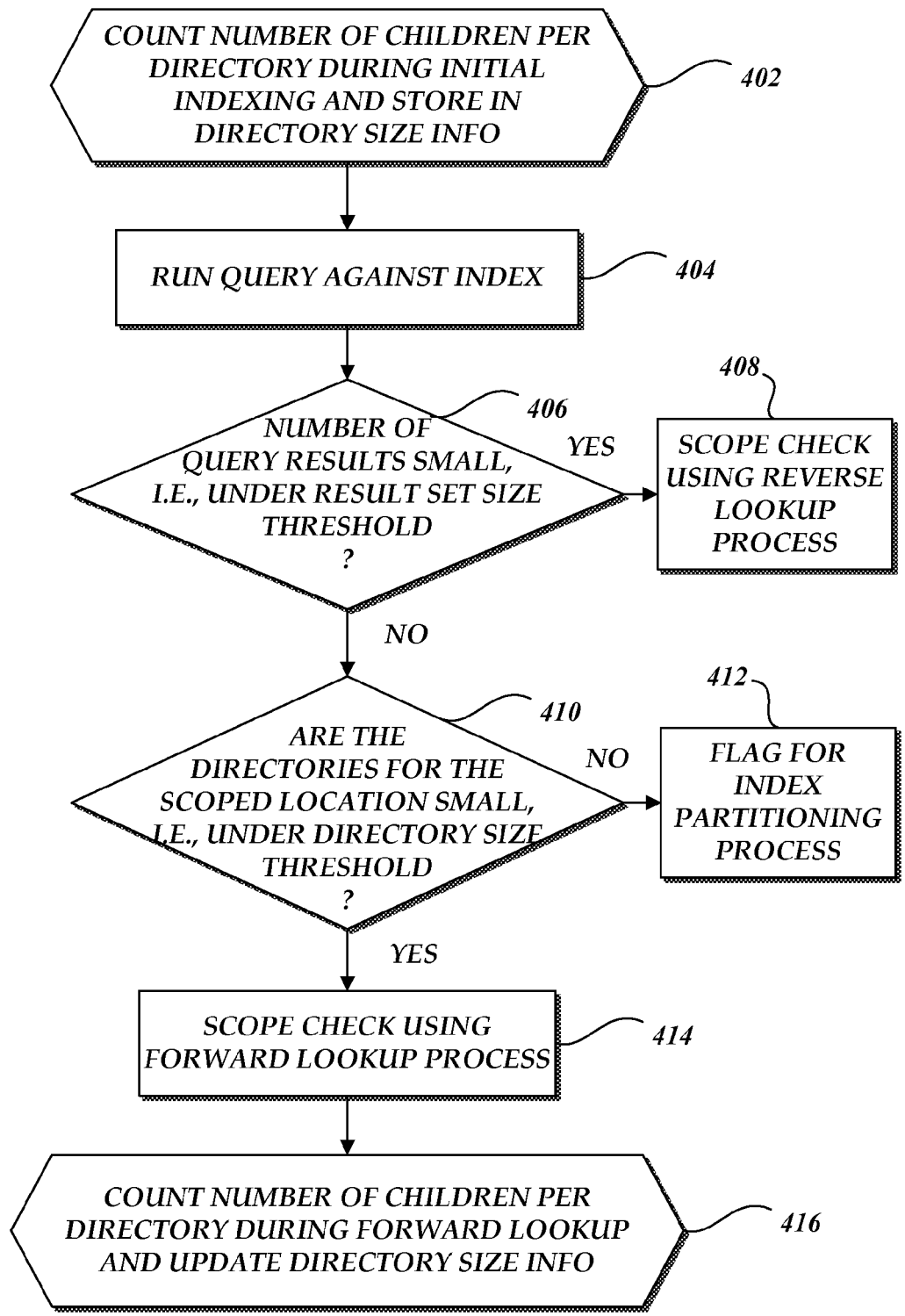
FIGS. 4-5 are flow diagrams illustrating certain aspects of performing a method of intelligent index processing according to one exemplary embodiment of the invention.
Figure 5:
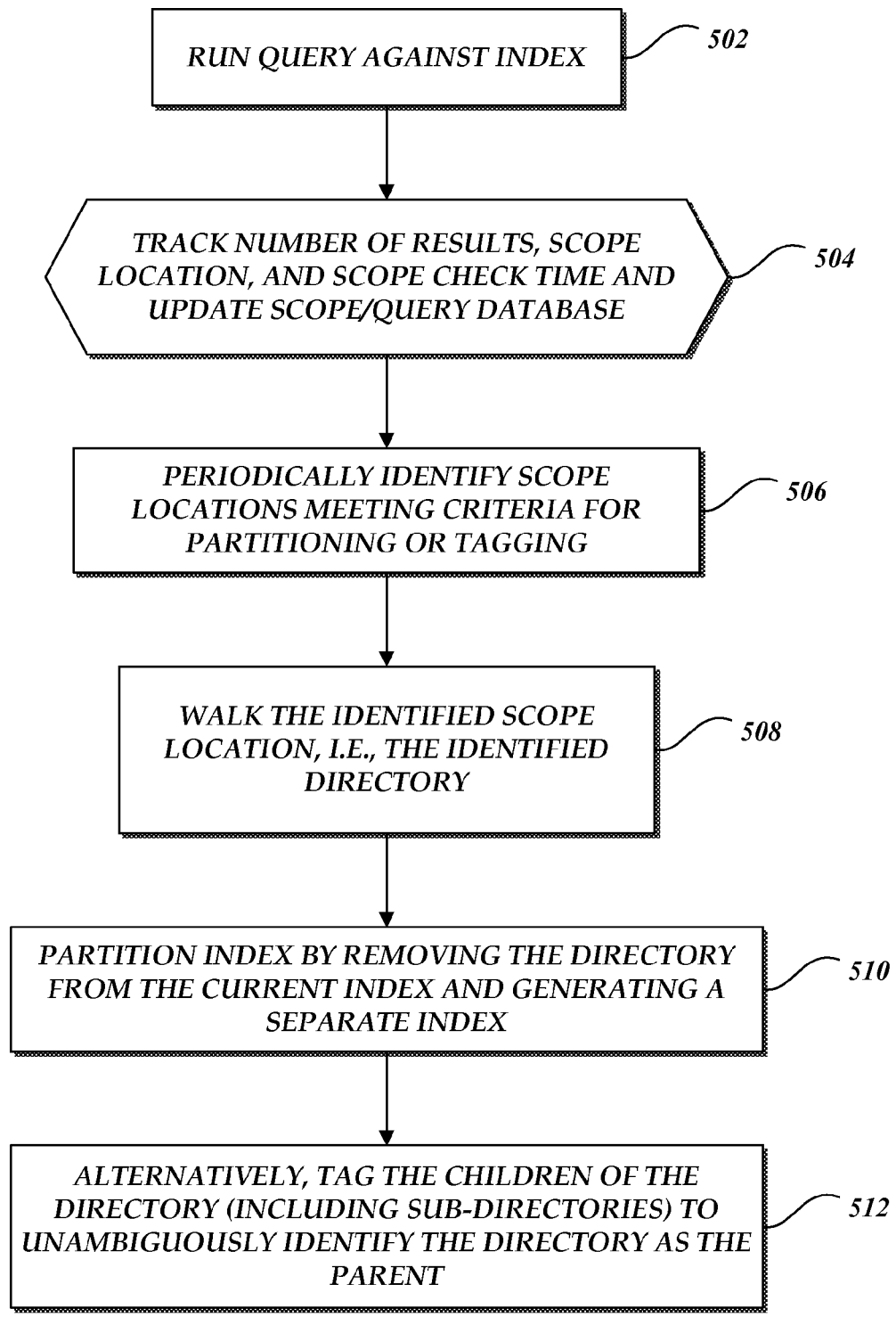

FIG. 4-5 are flow diagrams illustrating certain aspects of performing a method of intelligent index processing according to one exemplary embodiment of the invention. In FIG. 4, an efficient scoping method 400 begins processing at preparatory block 402, in which the number of children per directory is counted during initial indexing of files on a system. The counts are stored in a directory size information store, and thereafter the method 400 continues at block 404 in which a query is processed against an index producing a result set of candidate results, i.e., candidate results before performing any scope checking. At decision block 406, the method determines whether the number of candidate results in the result set for the query is considered small, where a small number is one that falls beneath a given threshold for the number of results in a result set. The given threshold may be predetermined or determined based on various characteristics of the indexes being searched, the system, etc. If the numbers of results is considered small, then the method 400 continues at process block 408 to perform scope checking on the result set using a conventional reverse lookup process as described in FIG. 2. If the number of results is not considered small, then the method 400 continues at decision block 410 to determine whether the directory/ies for the requested scope specified in the search query are small, i.e. under the directory size threshold 116. If so, the method 400 continues at process block 414 to perform scope checking on the result set using a forward lookup process as described in FIG. 2. If not, the method 400 branches to block 412 to flag the directory/ies as having been identified for the index partitioning process 500, as detailed in FIG. 5 below. The method 400 concludes at preparatory block 416 to count the number of children per directory during the forward lookup process, and to update the directory size information accordingly, in preparation for the next invocation of method 400, and in preparation for use by the intelligent index processing method described in FIG. 3 and below in FIG. 5.

In FIG. 5, an index partitioning method 500 begins processing at block 502 in which a query is processed against an index producing a result set of candidate results, i.e., candidate results before performing any scope checking. At preparatory block 504, the method 500 continues by performing a tracking function, by storing the number of results in the query, the requested scope location, and the amount of processing time expended during any scope checking performed on the result set of the query in a scope/query database. The scope/query database is thereafter maintained by the method 500 with newly tracked data as queries are run and the method is performed. Periodically, the method 500 identifies at block 506 those scope locations meeting criteria for index partitioning or child tagging to improve the efficiency for subsequent searches. The criteria include, among others, whether a particular scoped location, i.e. a directory, is experiencing a large number of searches as compared to the children in the directory, whether the directory is experiencing a significantly large number of searches as compared to the total number of searches in its parent, or a significantly large number of searches as compared to the total number of searches with the parent specified in the requested scope. A large number of searches in one location as compared to another is generally when the number of searches in one location is substantially greater than another location. Other criteria include whether the directory or directories comprising a scoped location is not considered small based on the current threshold 116 for directory size (see process block 412 in FIG. 4), whether a large amount of processor time is expended during scope checking, and may further include any other criteria that can serve as predictors or indicators of inefficient searching that, among other inefficiencies, may require an excessive amount of time for scope checking.

In one embodiment, at process block 508, the method 500 continues by walking those identified scope locations meeting the criteria, such as the identified directory or directories, and at process block 510 partitioning the index by removing the directory from the current index and generating a separate index, and/or at process block 512 alternatively tagging the children of the identified directory or directories to unambiguously identify the directory as the parent. The separate index and/or tagged children may then be advantageously used during subsequent searching and scope checking to improve search efficiency.

Figure 6:
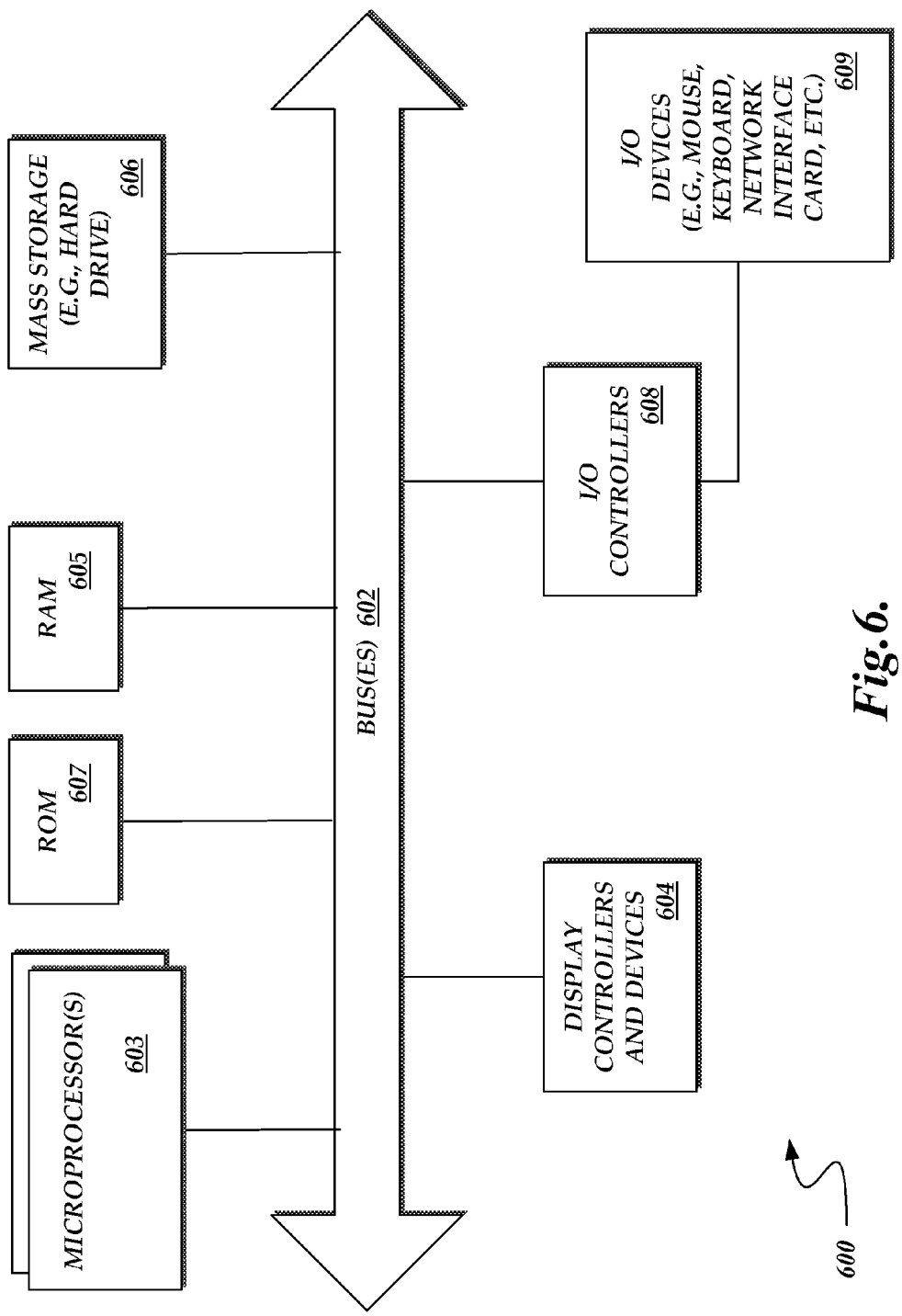
FIG. 6 is a block diagram overview of an exemplary embodiment of a data processing system, which may be a general purpose computer system and in which may operate any of the various methods described herein.

FIG. 6 illustrates an example of a typical computer system which may be used with the present invention. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 6 may, for example, be a Macintosh computer from Apple Computer, Inc.

As shown in FIG. 6, the computer system 600, which is a form of a data processing system, includes a bus 602 which is coupled to a microprocessor(s) 603 and a ROM (Read Only Memory) 607 and volatile RAM 605 and a non-volatile memory 606. The microprocessor 603 may be a G3 or G4 microprocessor from Motorola, Inc. or one or more G5 microprocessors from IBM. The bus 602 interconnects these various components together and also interconnects these components 603, 607, 605, and 606 to a display controller and display device 604 and to peripheral devices such as input/output (I/O) devices which may be mice, keyboards, modems, network interfaces, printers and other devices which are well known in the art. Typically, the input/output devices 609 are coupled to the system through input/output controllers 608. The volatile RAM (Random Access Memory) 605 is typically implemented as dynamic RAM (DRAM) which requires power continually in order to refresh or maintain the data in the memory. The mass storage 606 is typically a magnetic hard drive or a magnetic optical drive or an optical drive or a DVD RAM or other types of memory systems which maintain data (e.g. large amounts of data) even after power is removed from the system. Typically, the mass storage 606 will also be a random access memory although this is not required. While FIG. 6 shows that the mass storage 606 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers and/or adapters as is well known in the art. In one embodiment the I/O controller 608 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 607, RAM 605, mass storage 606 or a remote storage device. In various embodiments, hardwired circuitry may be used in combination with software instructions to implement the present invention. Thus, the techniques are not limited to any specific combination of hardware circuitry and software, nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 603.

What is claimed is:

1. A machine-implemented method of processing an index to facilitate searching the index, the method comprising:
   receiving a search having a query and a requested scope;
   running the query against an index to produce a result set;
   tracking a number of candidate results in the result set, the requested scope of the search, and an amount of time expended to filter the result set to the requested scope;
   identifying requested scope locations meeting criteria for inefficient searching based on the tracking; and
   partitioning the index for the identified scope locations meeting criteria for inefficient searching, wherein partitioning the index includes moving the identified scope locations meeting criteria for inefficient searching to a separate index, and moving identified scope locations includes tagging children of directories comprising the identified scope locations.

2. The machine-implemented method of claim 1, wherein locations meeting the criteria for inefficient searching comprises:
- locations experiencing a greater number of searches relative to children of the location,
- locations experiencing a greater number of searches relative to the total number of searches experienced in the parent of the location, and
- locations experiencing a large amount of processor time to scope check searches.

3. The machine-implemented method of claim 2, wherein locations meeting the criteria for inefficient searching further comprises locations having a number of children that exceeds a threshold size for the location to be considered small.

4. A machine-readable medium containing executable program instructions for causing a data processing system to perform a method of processing an index to facilitate searching the index, the method comprising:
- receiving a search having a query and a requested scope;
- running the query against an index to produce a result set;
- tracking a number of candidate results in the result set, the requested scope of the search, and an amount of time expended to filter the result set to the requested scope;
- identifying requested scope locations meeting criteria for inefficient searching based on the tracking; and
- partitioning the index for the identified scope locations meeting criteria for inefficient searching, wherein partitioning the index includes moving the identified scope locations meeting criteria for inefficient searching to a separate index, and moving identified scope locations includes tagging children of directories comprising the identified scope locations.

5. A machine readable medium as in claim 4, wherein locations meeting the criteria for inefficient searching comprises:
- locations experiencing a greater number of searches relative to children of the location,
- locations experiencing a greater number of searches relative to the total number of searches experienced in the parent of the location, and
- locations experiencing a large amount of processor time to scope check searches.

6. A machine readable medium as in claim 5, wherein locations meeting the criteria for inefficient searching further comprises locations having a number of children that exceeds a threshold size for the location to be considered small.

7. A data processing system comprising:
- means for receiving a search having a query and a requested scope;
- means for running the query against an index to produce a result set;
- means for tracking a number of candidate results in the result set, the requested scope of the search, and an amount of time expended to filter the result set to the requested scope;
- means for identifying requested scope locations meeting criteria for inefficient searching based on the tracking; and
- means for partitioning the index for the identified scope locations meeting criteria for inefficient searching, wherein partitioning the index includes moving the identified scope locations meeting criteria for inefficient searching to a separate index, and moving identified scope locations includes tagging children of directories comprising the identified scope locations.

8. The data processing system as in claim 7, wherein means for identifying requested scope locations meeting criteria for inefficient searching based on the tracking comprises:
- means for identifying locations experiencing a greater number of searches relative to children of the location,
- means for identifying locations experiencing a greater number of searches relative to the total number of searches experienced in the parent of the location, and
- means for identifying locations experiencing a large amount of processor time to scope check searches.

9. The data processing system as in claim 8, wherein means for identifying requested scope locations meeting criteria for inefficient searching based on the tracking further comprises means for identifying locations having a number of children that exceeds a threshold size for the location to be considered small.

10. A machine-implemented method of partitioning an inverted index, the method comprising:
- monitoring a search characteristic of processing a query against an inverted index, the query requesting a scope location;
- storing the search characteristic in association with the scope location requested for the query;
- determining whether to partition the inverted index based on whether the search characteristic stored in association with the scope location meets criteria for inefficient searching against the inverted index; and
- partitioning the inverted index for those scope locations meeting criteria for inefficient searching against the inverted index, wherein partitioning includes logically separating portions of the inverted index corresponding to those scope locations meeting criteria for inefficient searching, wherein logically separating comprises tagging children of directories comprising those scope locations.

11. The method as in claim 10, wherein criteria for inefficient searching include an indicator of inefficient searching.

12. The method as in claim 10, wherein criteria for inefficient searching include a predictor of inefficient searching.

13. The method as in claim 10, wherein the search characteristic being monitored is a number of candidate results produced during processing the query, and a criterion of inefficient searching is when the number of candidate results meets or exceeds a threshold number of candidate results.

14. The method as in claim 10, wherein the search characteristic being monitored is an amount of processor time expended during processing the query, and a criterion of inefficient searching is when the amount of processor time expended during processing the query meets or exceeds a threshold amount of processor time.

15. The method as in claim 10, wherein the search characteristic being monitored is a number of queries requesting the scope location and a criterion of inefficient searching is when the number of queries requesting the scope location meets or exceeds a threshold number of queries requesting a same scope location.

16. The method as in claim 10, wherein the scope location comprises one or more directories and a criterion of inefficient searching comprises at least one of:
- a directory in the scope location is experiencing a large number of searches as compared to a number of searches in the directory's children directories;
- a directory in the scope location is experiencing a large number of searches as compared to a total number of searches in the directory's parent directory;
- a directory in the scope location is experiencing a large number of searches as compared to a total number of searches in the directory's parent directory, and further wherein the parent directory is the requested scope location; or a size of the one or more directories comprising the scope location meets or exceeds a threshold size of a directory.

17. The method as in claim 10, wherein partitioning includes physically separating portions of the inverted index corresponding to those scoped locations meeting criteria for inefficient searching into respective separate inverted index files.

18. A non-transitory machine-readable storage medium storing program instructions that, when executed, cause a data processing system to perform a method of partitioning an inverted index comprising:
    monitoring a search characteristic of processing a query against an inverted index, the query requesting a scope location;
    storing the search characteristic in association with the scope location requested for the query;
    determining whether to partition the inverted index based on whether the search characteristic stored in association with the scope location meets criteria for inefficient searching against the inverted index; and
    partitioning the inverted index for those scope locations meeting criteria for inefficient searching against the inverted index, wherein partitioning includes logically separating portions of the inverted index corresponding to those scope locations meeting criteria for inefficient searching, wherein logically separating comprises tagging children of directories comprising those scope locations.

19. The machine-readable storage medium as in claim 18, wherein criteria for inefficient searching include an indicator of inefficient searching.

20. The machine-readable storage medium as in claim 18, wherein criteria for inefficient searching include a predictor of inefficient searching.

21. The machine-readable storage medium as in claim 18, wherein the search characteristic being monitored is a number of candidate results produced during processing the query, and a criterion of inefficient searching is when the number of candidate results meets or exceeds a threshold number of candidate results.

22. The machine-readable storage medium as in claim 18, wherein the search characteristic being monitored is an amount of processor time expended during processing the query, and a criterion of inefficient searching is when the amount of processor time expended during processing the query meets or exceeds a threshold amount of processor time.

23. The machine-readable storage medium as in claim 18, wherein the search characteristic being monitored is a number of queries requesting the scope location and a criterion of inefficient searching is when the number of queries requesting the scope location meets or exceeds a threshold number of queries requesting a same scope location.

24. The machine-readable storage medium storing program instructions that, when executed, cause a data processing system to perform a method of partitioning an inverted index as in claim 18, wherein the scope location comprises one or more directories and a criterion of inefficient searching comprises at least one of:
    a directory in the scope location is experiencing a large number of searches as compared to a number of searches in the directory's children directories;
    a directory in the scope location is experiencing a large number of searches as compared to a total number of searches in the directory's parent directory;
    a directory in the scope location is experiencing a large number of searches as compared to a total number of searches in the directory's parent directory, and further wherein the parent directory is the requested scope location; or
    a size of the one or more directories comprising the scope location meets or exceeds a threshold size of a directory.

25. The machine-readable storage medium as in claim 18, wherein partitioning includes physically separating portions of the inverted index corresponding to those scoped locations meeting criteria for inefficient searching into respective separate inverted index files.

26. A data processing system for partitioning an inverted index, the system comprising:
    means for monitoring a search characteristic of processing a query against an inverted index, the query requesting a scope location;
    means for storing the search characteristic in association with the scope location requested for the query;
    means for determining whether to partition the inverted index based on whether the search characteristic stored in association with the scope location meets criteria for inefficient searching against the inverted index; and
    means for partitioning the inverted index for those scope locations meeting criteria for inefficient searching against the inverted index, wherein partitioning includes logically separating portions of the inverted index corresponding to those scope locations meeting criteria for inefficient searching, wherein logically separating comprises tagging children of directories comprising those scope locations.

* * * * *